(12) United States Patent
Priddle et al.

(10) Patent No.: US 9,219,941 B2
(45) Date of Patent: Dec. 22, 2015

(54) RICH MEDIA STREAM MANAGEMENT

(75) Inventors: Clinton Priddle, Upplands Väsby (SE); Per Fröjdh, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1647 days.

(21) Appl. No.: 12/447,179

(22) PCT Filed: Oct. 10, 2007

(86) PCT No.: PCT/SE2007/000893
§ 371 (c)(1),
(2), (4) Date: Apr. 24, 2009

(87) PCT Pub. No.: WO2008/051136
PCT Pub. Date: May 2, 2008

(65) Prior Publication Data
US 2010/0142557 A1    Jun. 10, 2010

Related U.S. Application Data

(60) Provisional application No. 60/854,100, filed on Oct. 25, 2006.

(51) Int. Cl.
*H04N 7/10* (2006.01)
*H04N 7/025* (2006.01)
(Continued)

(52) U.S. Cl.
CPC ......... *H04N 21/435* (2013.01); *H04N 21/235* (2013.01); *H04N 21/234318* (2013.01); *H04N 21/41407* (2013.01); *H04N 21/4316* (2013.01); *H04N 21/44012* (2013.01);
(Continued)

(58) Field of Classification Search
USPC .................. 725/32, 37, 40, 43, 135, 138, 139
See application file for complete search history.

(56) References Cited

U.S. PATENT DOCUMENTS 5,696,500 A    12/1997    Diem
2002/0004755 A1    1/2002    Balthaser
(Continued)

FOREIGN PATENT DOCUMENTS

EP    1 324 320 A2    7/2003
KR    2002-0085985 A    11/2002
(Continued)

OTHER PUBLICATIONS

Setlur V et al: "More: A mobile open rich media environment" IEEE International Conference on Multimedia and Expo, XX, XX, Jul. 9, 2006, pp. 1-4, XP003011315 sections 4 and 6.
(Continued)

*Primary Examiner* — John Schnurr

(57) ABSTRACT

A secondary stream of rich media packets defining scene states of a sub-portion of a scene representable by a primary stream or rich media packets. Local random access data defining instructions for enabling creation, when being processed, of a starting state of the scene sub-portion without affecting the scene state of scene portions is provided. The local random access data is packed into at least one rich media packet, which is inserted into the secondary stream and transmitted to at least one user terminal. The local random access data can be used by terminals for tuning-in to the secondary stream and/or for error recovery relating to the secondary stream.

29 Claims, 7 Drawing Sheets

(51) Int. Cl.
*H04N 21/435* (2011.01)
*H04N 21/2343* (2011.01)
*H04N 21/235* (2011.01)
*H04N 21/414* (2011.01)
*H04N 21/431* (2011.01)
*H04N 21/44* (2011.01)
*H04N 21/4425* (2011.01)
*H04N 21/472* (2011.01)
*H04N 21/8543* (2011.01)

(52) U.S. Cl.
CPC .... *H04N 21/4425* (2013.01); *H04N 21/47205* (2013.01); *H04N 21/8543* (2013.01)

(56) References Cited

U.S. PATENT DOCUMENTS

2005/0088436 A1 4/2005 Swedberg et al.
2005/0131930 A1 6/2005 Jang et al.
2005/0226196 A1 10/2005 Suh

FOREIGN PATENT DOCUMENTS

WO     WO 99/39272 A1     8/1999
WO     WO 2004/029829 A1     4/2004

OTHER PUBLICATIONS

Open Mobile Alliance, Rich Media Environment Technology Landscape Report, OMA-WP-RME-20060711-D Draft, Jul. 11, 2006.
Shahab et al, Adaptation of MPEG-4 BIFS Scenes into MPEG-4 LASeR Scenes in MPEG-21 DIA Framework, Advances in Multimedia Information Processing—PCM 2005, Lecture Notes in Computer Science, 2005, vol. 3768/2005, abstract.
Ola Andersson et al, Mobile SVG Profiles: SVG Tiny and SVG Basic, W3C Recommendation Jan. 14, 2003, found in Internet: http://www.w3.org/TR/2003/REC-SVGMobile-20030114/.
Information technology—Coding of audio-visual objects—Part 20: Lightweight Application Scene Representation (LASeR) and Simple Aggregation Format (SAF). ISO/IEC JTC 1/SC 29. Jan. 23, 2006.
Schulzrinne, H. et al. RTP: A Transport Protocol for Real-Time Applications. Network Working Group. Request for Comments: 3550. Jul. 2003.
Nokia and Ericsson. More Technical Proposal for Dynamic and Interactive Multimedia Scenes (DIMS). 3GPP SA4 PSM ad-hoc meeting Tdoc S4-AHP255. Kista, Sweden. Apr. 11-12, 2006.

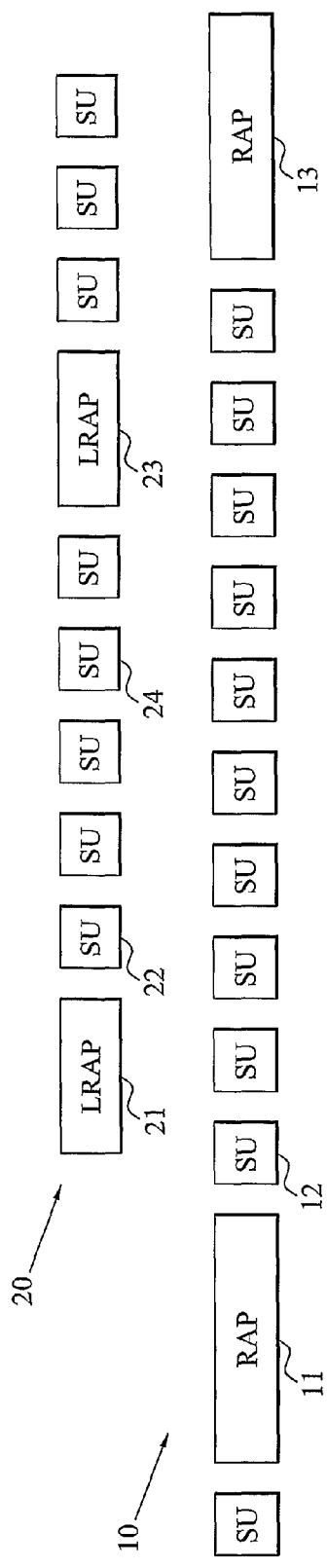
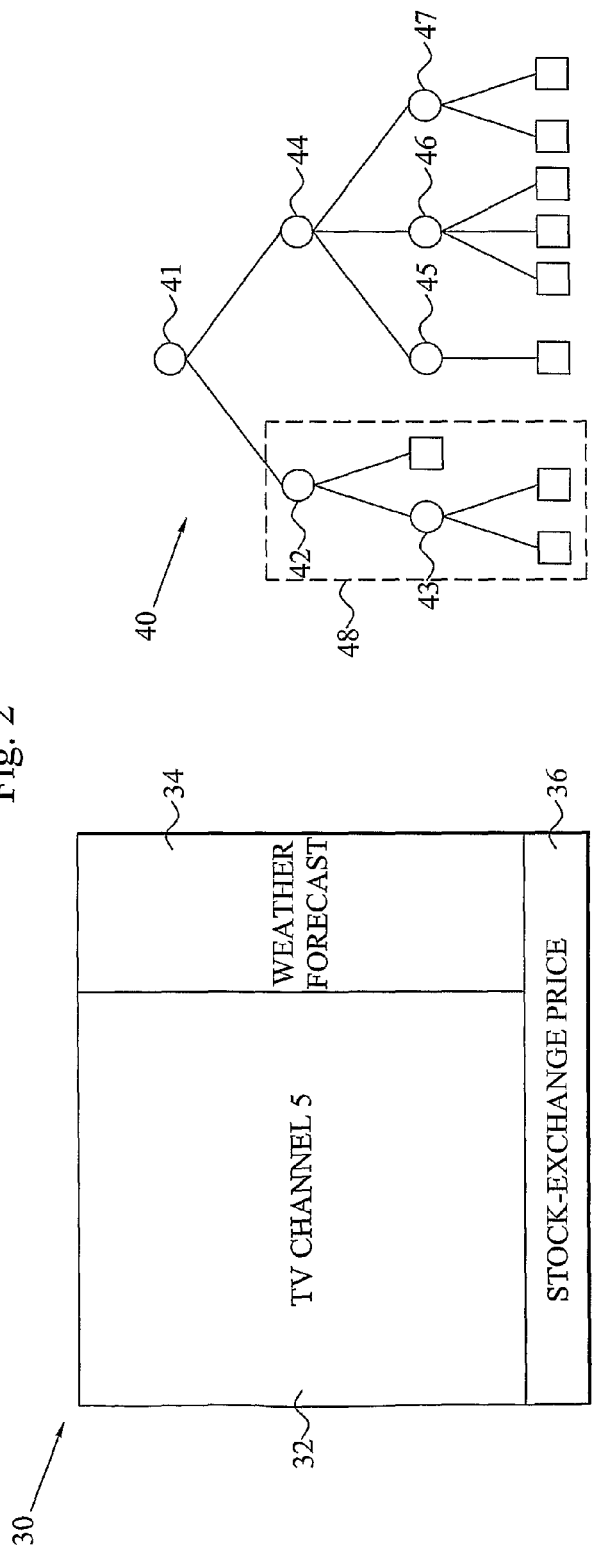

RICH MEDIA STREAM MANAGEMENT

This application claims the benefit of U.S. Provisional Application No. 60/854,100, filed Oct. 25, 2006, the disclosure of which is fully incorporated herein by reference.

TECHNICAL FIELD

The present invention generally relates to rich media management, in particular to the generation and usage of random access points in a secondary stream associated with a primary stream of rich media packets.

BACKGROUND

Scalable Vector Graphics (SVG) is an Extensible Markup Language (XML) based language for representation of static and dynamic vector graphics. SVG is vector-based which means that the content is not made for certain screen resolutions but can be easily scaled. SVG is standardized by the World Wide Web Consortium (W3C). The mobile profile of SVG version 1.1 was adopted by 3GPP Release 5 and it is today supported by roughly 100 million mobile handsets.

SVG Tiny 1.2 [1] is a more powerful version of SVG that is specifically designed for mobile devices and terminals. It is currently a W3C candidate recommendation and has been adopted by 3GPP Release 6. Support for a variety of new multimedia features, including full control of audio and video, is included along with micro Document Object Model (μDOM) and scripting.

In addition to being a media type for vector graphics, SVG can also be used as a scene description language, where a scene can be composed temporally as well as spatially. In fact, SVG Tiny 1.2 has been adopted as the presentation format for the 3GPP work item on Dynamic and Interactive Multimedia Scenes (DIMS) as well as for the Open Mobile Alliance (OMA) work item on Rich-Media Environment (RME). The standardization of DIMS has been finalized in 3GPP Release 7, whereas OMA is still working on finalizing RME. For DIMS (and also for RME), the main competing proposals were the Mobile Open Rich media Environment (MORE) [2] building on technologies from W3C and the Lightweight Application Scene Representation (LASeR) [3] standardized by MPEG. Both use SVG Tiny 1.2 as basis.

DIMS (RME) content, as opposed to pure SVG content, can be streamed using the Real-time Transport Protocol (RTP) [4]. The rendered SVG document is referred to as an SVG scene and will typically be updated with smaller scene updates. MORE and LASeR specify how SVG scenes can be transported over RTP. The mechanisms for scene updates are conceptually similar, albeit not identical. LASeR specifies its own mechanisms, whereas MORE uses Remote Events for XML (REX) [5] by W3C.

The ability to tune-in and the ability to recover from error by tuning-in are very important in DIMS, in particular when unreliable protocols as RTP are used. When an error occurs the processing terminal may use a next so-called random access point (RAP) to recover from the error. This RAP is decoded the same way as if the terminal was tuning in for the first time and everything from the old scene is deleted and a new tune-in is performed.

Another important feature of DIMS is the ability to combine streams from different sources, even sent over different protocols. A DIMS scene in the primary stream may invoke a secondary stream, which can modify the original scene.

Today, a tune-in point (RAP) in the secondary stream must contain information about the entire scene. This is very inefficient especially when the primary stream is delivered reliably and the secondary stream unreliably. This means that with such a prior art RAP, even parts of the scene received reliably will be re-sent in the tune-in points of the secondary stream.

SUMMARY

The prior art solution is marred by several disadvantages. Firstly, previously reliably sent media of the primary stream have to be re-sent possibly through an unreliable delivery protocol in the case of an error occurring within the secondary stream. Secondly, the server supplying the secondary stream must have knowledge about the scene in which the secondary stream will be used. Thus, the server must have access to the primary stream. As a consequence, several users can only subscribe to the same secondary stream if they have identical scene states in their applications. Furthermore, it is today not possible for users to download a primary scene and tune-in to a secondary broadcast stream as each user may tune-in at different times of the secondary stream.

The present invention overcomes these and other drawbacks of the prior art arrangements.

It is a general object of the present invention to provide a rich media packet management.

It is a particular object of the present invention to provide a rich media packet management that provides an error recovery and/or tuning-in possibility in a secondary or auxiliary rich media packet stream.

These and other objects are met by the invention as defined by the accompanying patent claims.

Briefly, the present invention involves provision and processing of rich media packets of a secondary or auxiliary stream to be used in connection with a primary or main stream of rich media packets defining a scene. The rich media of the secondary stream defines scene states and controls a sub-portion of the scene. Local random access data is provided for the secondary stream. This local random access data defines a complete set of instructions enabling creation, when being processed, of a starting state of the sub-portion of the scene. The starting state is furthermore obtainable without affecting the scene states of other portions of the scene. Thus, the local random access data of the present invention achieves a local or partial scene refresh and does not generate a complete scene refresh and the generation of a new scene. As a consequence, only the scene sub-portion defined by the secondary stream will be affected and set into a starting state using the local random access data of the present invention.

The provided data is included in a rich media packet, which is inserted into the secondary stream. The packet, together with other (scene update) packets of the secondary stream, can then be transmitted to user terminals for rendering.

The local random access data of the present invention can be used by terminals when tuning-in to the secondary stream and/or when recovering from error occurring in the reception or processing of rich media packets of the secondary stream.

When tuning-in to the secondary stream during an ongoing media session involving rendering a scene representable by rich media packets of a primary stream, a terminal starts listening to a channel carrying the packets of the secondary stream. The terminal identifies one of the packets as carrying local random access data, typically by investigating header information. Once identified, tuning-in is performed by processing the local random access data to create a starting state of a sub-portion of the scene but without affecting other scene portions. The terminal can then continue with receiving and processing rich media packets of the secondary stream to thereby update the state of the scene sub-portion in addition to the other scene portions.

In the case of error recovery in the secondary stream, a terminal searches through received rich media packets of the secondary stream following the erroneous packet. The terminal identifies such a rich media packet comprising local random access data of the invention. The error recovery involves processing the identified local random access data to create a starting state of a scene sub-portion without affecting a scene state of other scene portions. The terminal continues by receiving and processing scene update packets of the secondary stream to update the state of the scene sub-portion.

The invention also relates to a media server for providing a secondary stream, such a secondary stream and a user terminal processing rich media data of a primary and a secondary stream.

SHORT DESCRIPTION OF THE DRAWINGS

The invention together with further objects and advantages thereof, may best be understood by making reference to the following description taken together with the accompanying drawings, in which:

FIG. 2 is a schematic overview of a primary and secondary stream of rich media packets;

FIG. 3 is an overview of a possible rich media scene with different scene portions;

FIG. 4 illustrates organization of scene elements in a tree structure;

DETAILED DESCRIPTION

Figure 1:
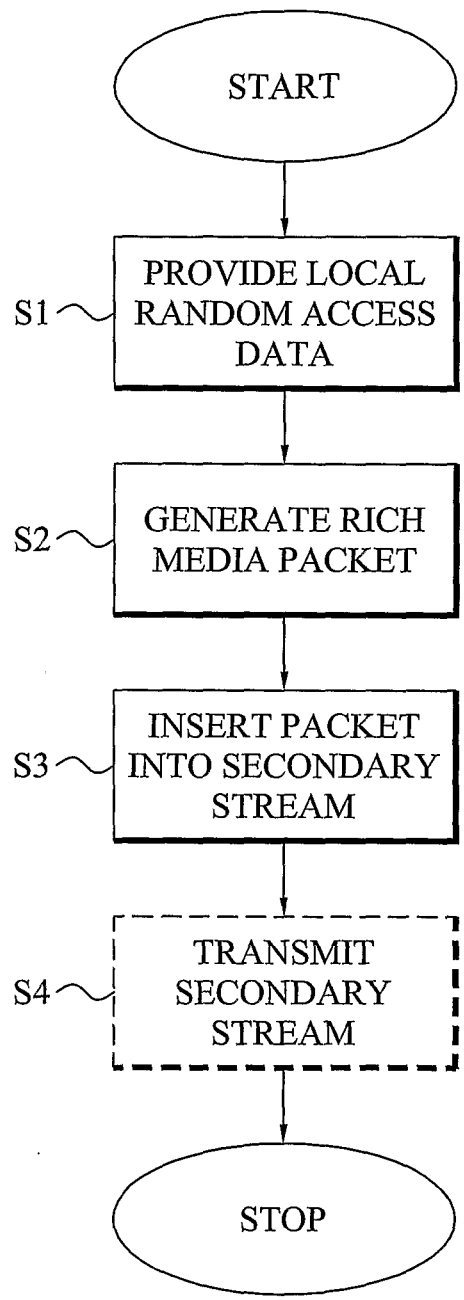
FIG. 1 is a flow diagram illustrating a method of providing a secondary stream of rich media packets according to an embodiment of the present invention.

Throughout the drawings, the same reference characters will be used for corresponding or similar elements.

The present invention generally relates to rich media management, in particular to the generation and usage of random access points in a secondary stream associated with a primary stream of rich media packets.

As is well known in the art, DIMS is a dynamic, interactive, scene-based media system which enables display and interactive control of multimedia or media data, such as audio, video, graphics, images and text. According to the present invention rich media relates to media and multimedia content that can be processed and rendered to form different scenes at a display screen of a rendering terminal. Such rich media content include graphics, in particular vector graphics and scalable vector graphics (SVG), static and/or continuous media content. Examples of static content include images and text, while video and audio is regarded as continuous media. Thus, rich media packets contains data and instruction allowing, when being processed at the terminal, rendering of rich media scenes and updating of such scenes.

A scene can be regarded as being divided into different sub-portions, for instance occupying different portions of a display screen when being processed. In such a case, the scene data relating to these sub-portions can originate from and be carried by different streams of rich media packets. Generally, a primary stream refers to a stream or a file defining a complete scene tree and allows building a complete (DIMS) scene. This primary stream can have one or more associated secondary streams, which only manage specific portions of the scene tree.

The primary and the at least one secondary stream can be transmitted over a same protocol but also over different protocols. For instance, rich media packets of the primary scene can be sent reliably through downloading, while a secondary stream could be sent using a less reliable protocol, such as RTP.

The primary and secondary streams of the prior art basically comprises rich media packets of two different classes. Firstly, a data packet can contain a so-called random access point (RAP) or complete scene. The content of the RAP packet(s) describes the spatial organization of scene elements, the temporal organization of scene elements, synchronization information and any interaction among the elements. Thus, this information is enough for rendering a complete scene without the usage of any information of previous rich media packets. This means that a client can use the scene-containing packet for initializing the presentation and layout of the rich media. In the prior art, initiation of media rendering and recovery of previous reception and decoding error is limited to these so-called RAPs. Both primary and secondary streams contain RAPs. In the prior art, there is no direct difference in processing a RAP carried in the secondary stream as compared to a RAP of the primary stream as both RAPs will induce a complete refresh or initiation of the scene and a complete scene tree refresh. Thus, all sub-portion of the scene will be re-set to a starting state or a new scene.

The vast majority of the packet stream comprises scene update packets comprising incremental updates to a scene defined by a previous RAP or a scene representable by rendering a previous RAP and a number of previous scene update packets. The scene update packets define operations such as scene element addition, scene element deletion, scene element replacement, scene element attribute updates and new scene operations. In the art, a scene update of the secondary stream is generally applicable only to the scene sub-portion or scene tree sub-portion defined by the secondary stream.

Sometimes the expressions complete Extensible Markup Language (XML) document and XML document updates are used for denoting scenes and scene updates, respectively. In the following application, the expressions scenes and scene updates will consistently be employed. However, this encompasses alternative denotations such as complete XML documents and document updates. The RAP, scenes and scene updates does though not necessarily have to be based on XML. An example of a non-XML based scene descriptor is Flash. The XML document(s) can be sent in clear context or be binarized. Examples of such binarization methods include gzip (GNU zip), compress, LASeR binary and BiM (Binary MPEG format for XML).

In clear contrast to the prior art, the present invention provides a new type of random access data that is applicably only to a given stream, such as a specific secondary stream. This means that a processing of such local random access data will cause a partial scene refresh affecting only the sub-portion of the total scene that is defined by the specific secondary stream. Remaining scene portions will be left unaffected. This should be compared to a RAP in the primary stream or a RAP in the secondary stream according to the prior art, which results in a complete scene refresh into a new scene.

The basic idea of the new local random access data of the present invention is to affect and refresh only those portions of the scene and scene tree that are associated with the secondary stream carrying the local random access data.

FIG. 1 is a flow diagram illustrating a method of providing a secondary stream of rich media packets according to the present invention. The packets of the secondary stream define scene states of a sub-portion of a complete scene representable by an associated primary stream of rich media packets. The method starts in step S1, where local random access data is provided. This local random access data defines a complete instruction set for enabling, when being processed at a user terminal, creation of a starting state of the sub-portion of the scene defined or associated with the secondary stream. Furthermore, this partial scene refresh into the starting state can be performed without affecting the scene state of other portions of the scene. The local random access data defines a complete and sufficient set of instructions for creating the starting state and partial scene refresh without usage of any instructions contained in other previous rich media packets of the secondary stream, or indeed the primary stream or another secondary stream.

A next step S2 generates a rich media packet based on the provided local random access data. Thus, the provided local random access data is included into one or multiple, i.e. at least two, rich media packets. The at least one packet containing the local random access point (LRAP) data is inserted into the secondary stream in step S3 and can then be sent to one or more requesting user terminals in step S4. The packet stream transmission can be performed according to any transmission protocol and mechanism known in the art. For instance, the packets may be downloaded or streamed to one or more user terminals. Alternatively, a broadcast or multicast transmission to multiple terminals in a communication network can be possible. Also unicast-based transmission protocols can be used for the rich media packets of the present invention. The method then ends.

FIG. 2 schematically illustrates a primary stream 10 of rich media packets 11, 12, 13. The stream comprises RAP containing packets 11, 13 that will cause, when being processed, a complete scene refresh into a new scene affecting all portions of the scene and the complete scene tree. These RAPs 11, 13 can be used by user terminals when joining or tuning-in to the primary stream 10. Thus, processing in connection with tuning-in can only be started in connection with such a RAP 11, 13. The RAPs are also of use in connection with reception, decoding or processing error of one of the scene update packets 12 as is well known in the art.

The primary scene 10 is in FIG. 2 associated with a secondary stream 20 comprising rich media packets 21, 22, 23, 24. This secondary stream 20 comprises at least one, preferably multiple, LRAP 21, 23 according to the present invention. Thus, these LRAP 21, 23 provides, when being processed, a local/partial refresh of scene portion or a sub-portion of the scene tree without affecting other scene (tree) portions. These LRAP 21, 23 can be used in a same manner as RAP 11, 13 of the primary stream 10. Thus, the LRAP 21, 23 are used for tuning-in to the secondary stream 20 and/or for recovering from errors when receiving, processing or decoding one of the scene update packets 24 of the secondary stream 20.

FIG. 3 schematically illustrates a scene 30 being rendered at a display screen. The scene 30 comprises different scene portions 32, 34, 36. In the figure, a main scene portion 32 displays video data of a TV channel. Associated scene portions 34, 36 shows, for instance, weather forecast and stock-exchange price. In such a setting, these associated scene sub-portions 34, 36 could each be managed by a separate secondary stream associated to a primary stream carrying the rich media data defining the TV channel scene portion and carrying RAPs affecting the whole scene 30, i.e. also the scene sub-portions 34, 36.

Thus, a RAP in the primary stream and a RAP in a secondary stream according to the prior art will lead to a new scene 30 and refresh of all scene portions 32, 34, 36. In clear contrast, a LRAP of the present invention will only define a starting state of the scene sub-portion 34 or 36 associated with the secondary stream carrying the LRAP while leaving the other scene portions 32 and 36 or 34 unaffected by the LRAP.

Though, all RAP-containing packets 21, 23 of the secondary stream preferably comprises local random access data of the present invention, the present invention can also be used in connection with a secondary stream having rich media packets comprising complete random access data of the prior art and other rich media packets comprising local random access data of the present invention in addition to the scene update containing packets.

A scene is often represented by a scene tree in the art, as illustrated in FIG. 4. Such a scene tree 40 comprises multiple tree nodes 41 to 47 defining different objects and portions of the complete scene. A RAP in the primary stream and a RAP in a secondary stream according to the prior art will cause a complete refresh of all the nodes 41 to 47 of the tree 40. A LRAP of the present invention will, however, only refresh a sub-portion 48 of the tree 40 and therefore only affect one or more nodes 42, 43 of the tree 40 but not other tree nodes 41, 44, 45, 46, 47.

Figure 5:
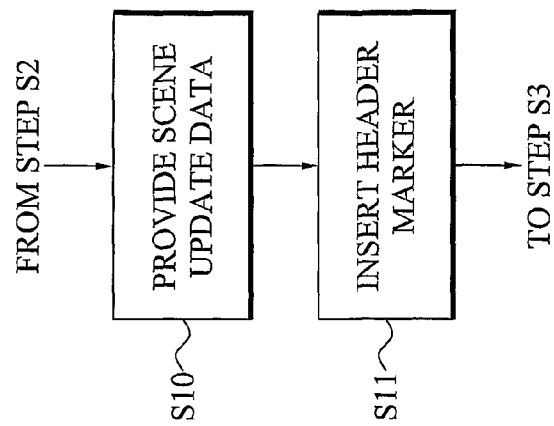
FIG. 5 is a flow diagram illustrating additional steps of the providing method of FIG. 1.

FIG. 5 is a flow diagram illustrating additional steps of the stream providing method of FIG. 1. The method continues from step S2 of FIG. 1. In a next step S10, scene update data is provided. This scene update data is applicable to the starting state defined by the local random access data to "move" the starting state to a scene state of the scene sub-portion associated with the secondary stream. This scene update data applicable to the starting state defined by the LRAP can be sent in a separate scene update packet (packet 22 in FIG. 2 if packet 21 contains the LRAP). However, in another embodiment, the scene update data can be included, together with the local random access data, into a same rich media packet in step S10. In such a case, a user terminal receiving the rich media packet could process both the local random access data and the scene update data included therein. However, in the other cases the local random access data could be regarded as redundant. This means that a user terminal receiving the rich media packet may decide whether to process the local random access data or not. Generally, the LRAP is then only utilized by user terminal tuning-in to the secondary stream or user terminals having experienced an error in a previous rich made packet of the secondary stream. Other terminal can omit processing/rendering the LRAP and only process the included scene update information.

The rich media packet could contain the following portions:

```
<LRAP-specific>
    ...
    Partial scene refresh into starting state for scene sub-portion
    ...
</LRAP-specific>
<update>
    ...
    Update information
    ...
</update>
```

In a preferred embodiment, the method continues to step S11, where a header marker of the rich media packet is inserted or set to a predefined value signaling that the packet comprises a LRAP. The marker is a valuable information source for terminals wanting to tune in to the secondary stream or terminals having experienced a reception or decoding error of a previous rich media packet (scene update packet or LRAP packet) of the secondary stream. These terminals would simply investigate the header portions of the received packets to identify a next LRAP containing packet.

The header marker could have a value indicating that the included local random access data is mandatory. This means that all terminals listening to the particular secondary stream should process the random access data in the packet and not only tuning-in or error-recovering terminals. Correspondingly, the header marker can have a value representing a redundant LRAP. In such a case, the included local random access data need only be processed by terminals tuning-in to the stream or recovering from a previous packet error. The header marker can also further signal that the rich media packet comprises, in addition to a LRAP of the invention, scene update information, in particular if the LRAP is signaled as redundant.

The header marker inserting/setting step S11 of FIG. 5 can be performed independently of whether scene update data is provided or not. In such a case, step S10 can be omitted altogether and only step S11 is performed. In either case, the method then continues to step S3, where a rich media packet comprising the LRAP, the header marker and optionally the scene update data is generated.

The local random access data of the present invention preferably comprises a complete instruction set allowing provision of the starting state of the scene sub-portion associated with the secondary stream. The local random access data preferably allows provision of the starting state irrespective of what previous rich media packets of the secondary stream have been lost or if the secondary stream is tuned-in for the first time. The instructions included in the local random access data can depend on the particular rich media data the secondary stream controls. A typical example of a possible partial scene refresh could be the inclusion of an instruction causing a removal of a scene element from the scene sub-portion and then another command causing an insertion of a correct version of the scene element in the sub-portion to form the starting state. Terminals tuning-in to the secondary stream of course does not yet have any scene element of the secondary stream to remove. These terminals simply insert the referred version of the scene element in the intended sub-portion of the scene. In the case of error recovery, the erroneous scene element is removed and correct version is inserted in the correct scene sub-portion.

An example of such LRAP instruction using REX (Remote Events for XML) could be:

```
<dims : LRAP>
<rex xmlns='http://www.w3.org/ns/rex#'>
    <event target='id("advertisement-node001")'
    name='DOMNodeRemoved'/>
        <g xml : id='advertisment-node0001'/>
</rex>
</dims : LRAP>
<rex xmlns='http://www.w3.org/ns/rex#'>
    <event target='id("advertisement-node001")'
    name='DOMNodeInserted'>
    </event>
</rex>
```

The first instruction removes the scene element having node identifier advertisement-node001. The second instruction then inserts a correct version of the scene element. As can be seen from this illustrative example, the different scene elements preferably have associated identifiers. In such a case, these identifiers can be used for identifying the sub-portions of the scene that would be affected by the local random access data. Briefly returning to FIG. 4 and the scene tree 40, each node 41 to 47 in the tree 40 can have an associated node identifier. By identifying a particular node 42, also nodes downstream of that node 42 will be affected by the LRAP.

Other possible LRAP instructions that can be used according to the present invention is setting or re-setting an attribute value associated with a sub-portion of the scene. For instance, the scene-sub portion controlled by the secondary stream could be displaying clock telling the current time. A LRAP instruction could then re-setting the current time of a clock. A similar scenario is possible for a thermometer telling the current external temperature.

As was discussed in the foregoing, the LRAP contains the complete set of instructions required for achieving the starting state of the scene sub-portion without requiring instructions contained in previous rich media packets of the secondary stream. Thus, an instruction defining adding a number N to an attribute value is not a suitable LRAP instruction as the attribute value may indeed be wrong due to a terminal missing a previous scene update packet setting another value to the attribute value. In clear contrast the LRAP instruction of the invention would then set the attribute value to a number. With reference to FIG. 2, the LRAP 23 of the invention is preferably so general that it can be used to achieve the starting state of the scene sub-portion irrespective of which previous LRAP packet 21 or scene update packet 22, 24 that was incorrectly received. Thus, the LRAP packet 23 could be used by a first terminal which incorrectly received a first scene update packet 22. The same LRAP packet 23 can also be used a second terminal which did not correctly receive a second previous scene update packet 24.

Figure 6:
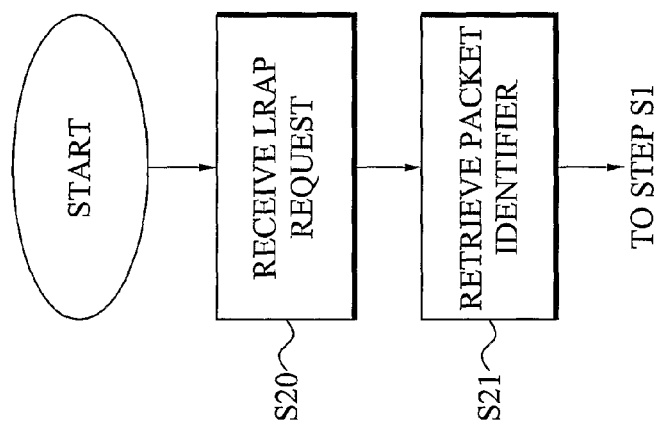
FIG. 6 is a flow diagram illustrating additional steps of the providing method of FIG. 1.

Although the instruction set of the LRAP is preferably general enough to allow the provision of the starting state irrespective of which previous rich media packet of the current stream that was not correctly received or processed by a terminal, the invention can also generate LRAP based on terminal requests. Such a procedure is illustrated in FIG. 6. The method starts in step S20, where a terminal-specific request for local random access data is received. This request is generated by a terminal not having correctly received or processed a previous rich media packet of the secondary stream. As is well known in the art, data packets generally have assigned packet identifiers, e.g. included in the packet headers. In such a case, the LRAP request can include an identifier of the incorrectly received/processed rich media packet and that identifier is retrieved in step S21. The method then continues to step S1 of FIG. 1, where a local random access data is provided based on the LRAP request. This embodiment allows generation of specific LRAP meaning that they are used to combat a previous error of a specific rich media packet. As a consequence, more specific instructions can be included in the LRAP as compared to a general LRAP that is intended to be used for regardless of where the packet error occurred in the secondary stream.

The usage of local random access points in a secondary stream according to the present invention enables efficient separation of transmission of the primary stream and the secondary stream. Furthermore, data (of the primary stream) which has been reliably acquired need not be re-transmitted in the LRAP of the secondary stream. The present invention also allows the static part of a scene to be downloaded, while the dynamic parts defined by the secondary stream(s) are updated over RTP.

Furthermore, by only containing instructions applicable to a sub-portion of the scene (tree), the rich media packets of the secondary stream containing LRAP of the invention can be much smaller than the RAP-containing packets of the prior art.

Processing of a LRAP of the secondary stream does not affect the rest of the scene. This means that interactivity is not loss, there is no disruption in playback and no complex processing cost due to an entire DOM reconstruction as in the prior art.

Figure 7:
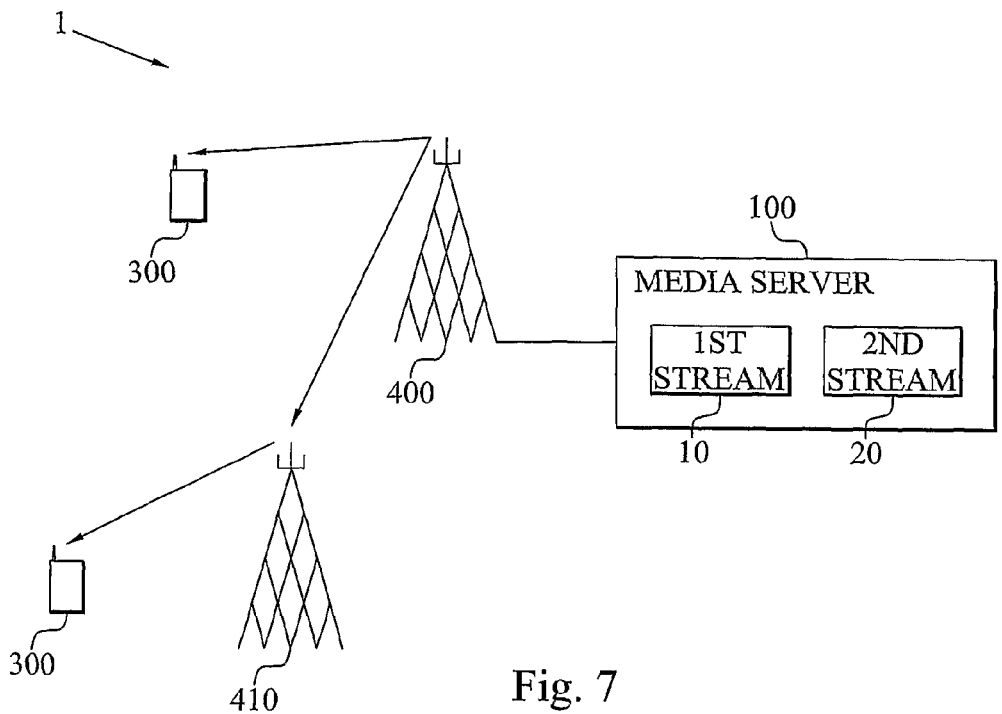
FIG. 7 is a schematic overview of a portion of a communication network comprising a media server according to the present invention.
Figure 8:
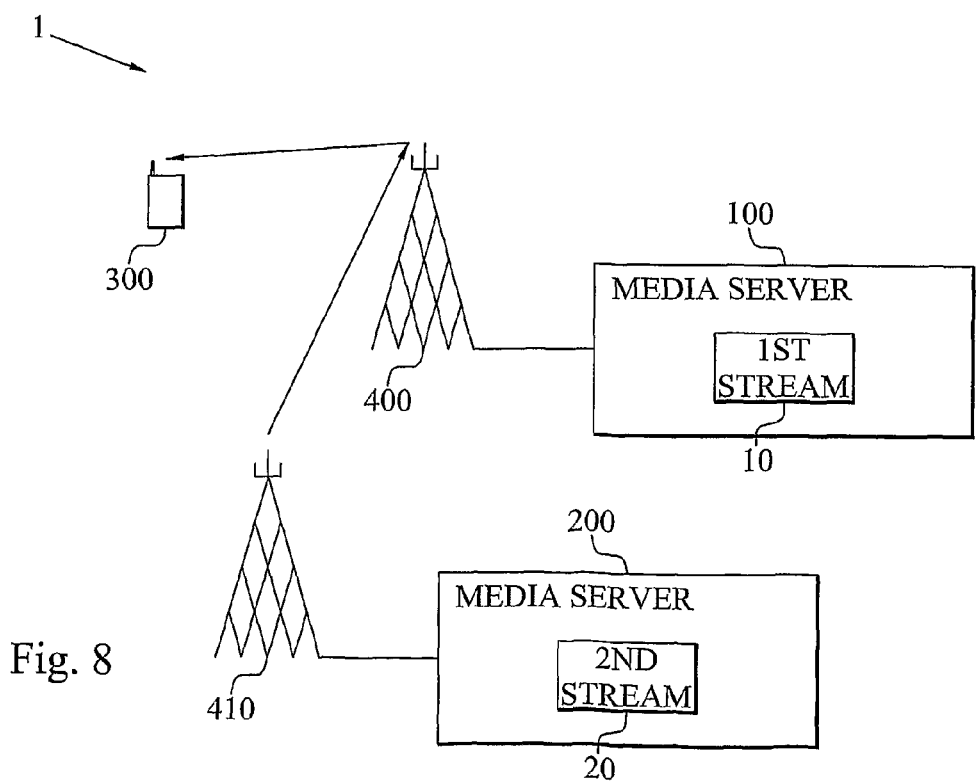
FIG. 8 is a schematic overview of another portion of a communication network comprising a media server according to the present invention.

FIG. 7 is a schematic overview of a portion a communication network 1 housing a media server 100 according to the present invention. In this embodiment, one and a same media server 100 provides and forwards both a primary stream 10 and an associated secondary stream to different user terminals 300, here using the infrastructure, i.e. base stations 400, 410, of a mobile network 1. However, the present invention can advantageously be used in connection with a network 1 and media server architecture as illustrated in FIG. 8. In this figure, a first media server 100 provides and forwards the primary stream 10 to user terminals 300. The secondary stream 20 is here provided by a separate media server 200 connected to the same or different base station 400, 410 as the first media server 100. As the LRAP in the secondary stream 20 only affects those portions of the scene (tree) that is handled by the rich media of the secondary stream 20, the second server 200 need not have any knowledge about the scene in which the secondary stream 20 is to be used. Thus, the second server 200 does not need to have any information of the primary stream 10 when providing and transmitting the secondary stream 20. This makes it possible for the second server 200 to supply the same secondary stream 20 to many different user terminals 300 with different base scenes. It also makes it possibly to apply more than one secondary stream 20 at a time. Furthermore, the secondary stream 20 can be broadcast by a base station 410 without requiring the primary stream 10 to be sent over broadcast but, for instance, through (point-to-point or point-to-many) download.

Figure 9:
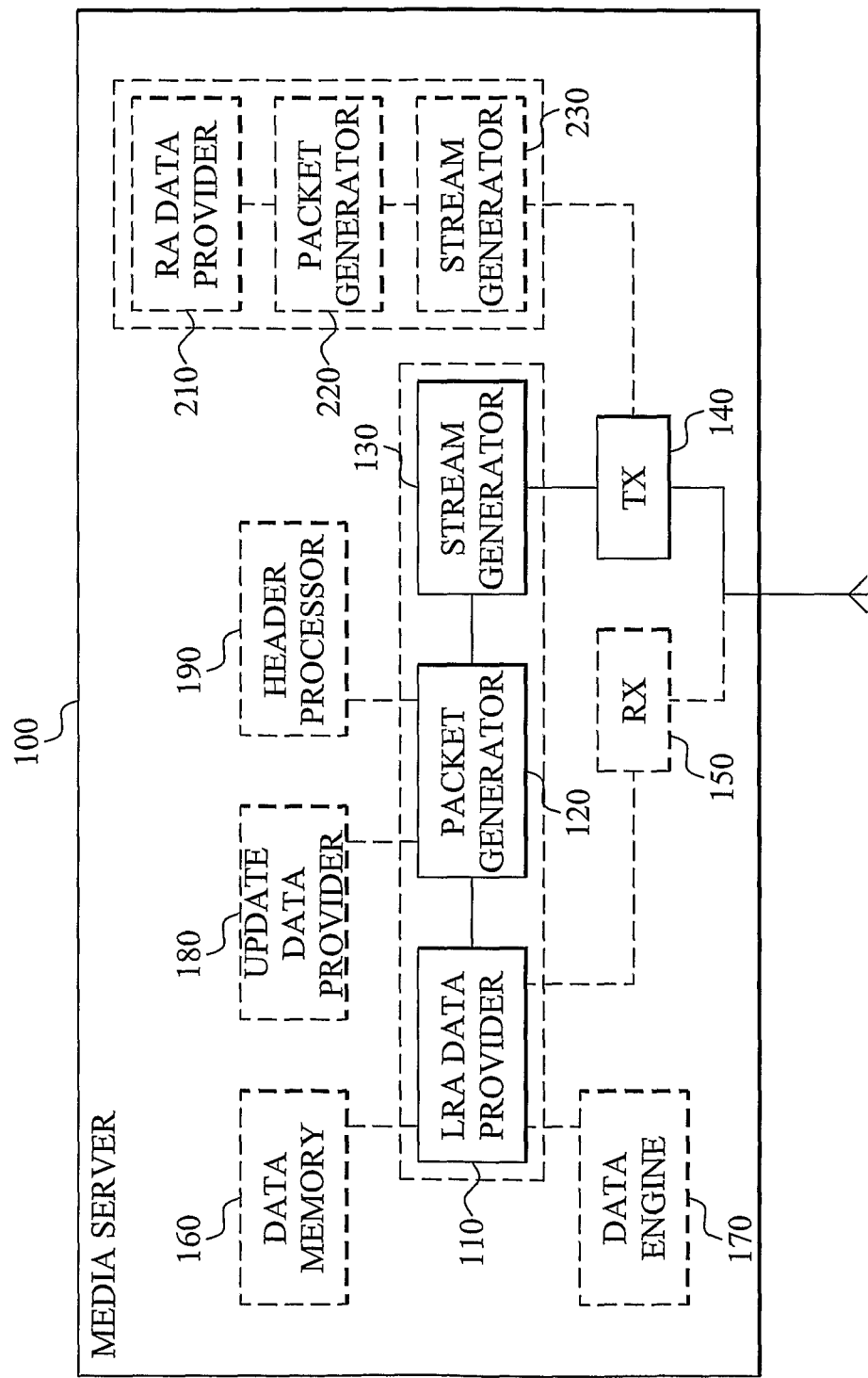
FIG. 9 is a schematic block diagram of a media server according to an embodiment of the present invention.

FIG. 9 schematically illustrates a media server 100 according to the present invention. The media server 100 comprises a data provider 110 for providing local random access data according to the invention, which data defines a complete instruction set for enabling creation of a starting state of a scene sub-portion defined by a secondary stream. This creation is possibly during data processing without affecting a scene state of other portions of the scene representable by a primary stream of rich media packets. The data provider 110 can be arranged for providing the local random access data from a connected data memory 160 storing such LRAP data.

The memory 160 could then contain pre-defined instructions, from which the data provider 110 selects a suitable instruction set to use as LRAP data. In addition, the memory 160 can contain identifier(s) of the particular nodes or scene sub-portions that the secondary stream manages. Alternatively, the media server 100 comprises or is connected to a data engine 170 that generates LRAP data on demand. The relevant instructions and identifiers used for creating the LRAP data are then generated by the engine 170 and forwarded to the data provider 110.

The media server 100 may optionally include a receiver 150 arranged for receiving terminal-specific requests for LRAP. The receiver 150 forwards the request to the data provider 110, which processes the request. Preferably, the provider 110 provides the LRAP data from the memory 160 and/or engine at least partly based on the request, such as based on a packet identifier included in the request.

The provided local random access data is forwarded from the data provider 110 to a packet generator 120. The generator 120 creates a rich media packet or multiple such packets comprising the received LRAP data. The packet generator 120 can be connected to an optional update data provider 180. This update data provider 180 provides scene update information applicable to the starting scene state representable by the local random access data from the data provider 110. The packet generator 120 may also insert this scene update data in the same rich media packet or in a following scene update packet.

An optional header processor 190 is connected to the packet generator 120. The processor 190 sets header markers of the rich media packet according to pre-defined values signaling whether the rich media packet comprises a LRAP, whether the LRAP is redundant or mandatory and/or whether the packet also comprises scene update data.

The rich media packet is forwarded from the generator 120 to a stream generator 130 arranged for generating the secondary stream. The stream generator 130 inserts the received rich media packet into the secondary stream and forwards it to a transmitter 140, which sends the packet and other packets of the secondary stream to listening user terminal(s).

The media server 100 may optionally also provide rich media packets of a primary stream. In such a case, the server 100 comprises a data provider 210 for providing random access data and scene update data applicable to the primary stream. The provided random access data enables creation of a complete new scene, when being processed, and thereby affects all portions of the scene (tree). A packet generator 220 is arranged for packeting the data from the data provider 210 into rich media packets, which are inserted into the primary stream by a stream generator 230. The packets of the primary stream are sent by the transmitter 140 or a dedicated primary stream transmitter.

The units 110-150, 170-190 and 210-230 of the media server 100 may be provided as software, hardware or a combination thereof. The media server 100 may be arranged in a network node of a communication network, such as a mobile communication network. A distributed implementation is also possible, in which units of the media server 100 are implemented in more than one network node.

Figure 10:
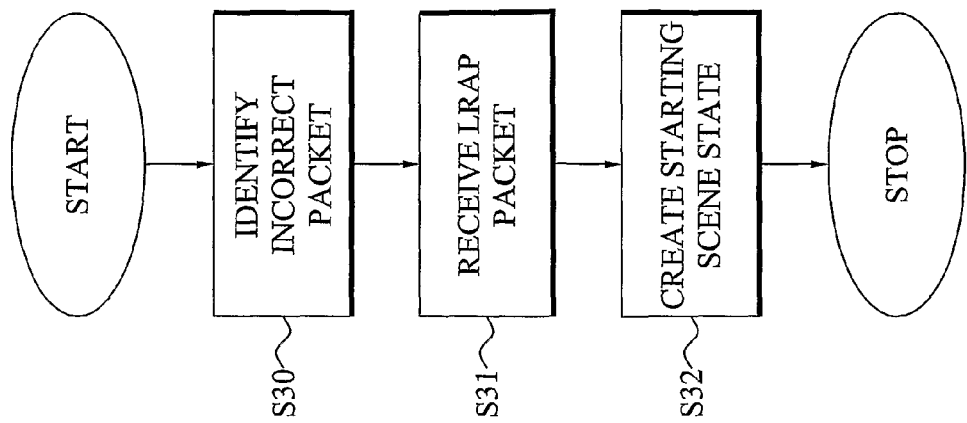
FIG. 10 is a flow diagram of an error recovery method according to an embodiment of the present invention.

As was discussed in the foregoing, the local random access data of the secondary stream can be used for error recovery and/or when tuning-in to the secondary stream. FIG. 10 is a flow diagram illustrating a method of recovering from a processing or reception error in rich media data of the secondary stream. The starts in step S30, where the processing terminal identifies a rich media packet of the secondary stream, which was not correctly received by the terminal and/or could not be correctly processed by the terminal. The terminal must then initiate an error recovery procedure for the rich media of the secondary stream. This procedure involves awaiting a next rich media packet comprising a LRAP of the invention in the secondary stream. The identification of the packet among the received packets of the primary and secondary stream(s) is performed at least partly based on a header marker of the packet, as previously described. Thus, a next step S31 involves receiving and identifying a rich media packet of the secondary stream comprising local random access data. This local random access data is processed in step S32 for the purpose creating a starting state of a sub-portion of a rendered scene (defined by rich media of an associated primary stream) but without affecting a scene state of the other scene portions. Thus, the processing of the local random access data triggers a partial refresh of only a scene sub-portion to thereby correct for the previous reception/processing error. The reception and processing of rich media packets can then continue as before with the following rich media packets of the secondary stream and the primary stream. The method then ends.

With reference to FIG. 2, assume that a user terminal is currently receiving rich media packets 11, 12, 21, 22 of both the primary 10 and secondary 20 streams. However, one of the packets 24 in the secondary stream 20 was not correctly received or processed. The terminal receives and investigates rich media packets of the secondary stream (and of course the primary stream) to identify a next LRAP carrying packet 23. Once that packet 23 is received and processed, the scene state of the scene sub-portion defined by the secondary stream 20 can be corrected and the rendering continues with the following packets of the primary and secondary stream. In this context, the starting state of the scene sub-portion achieved by processing of the LRAP corresponds to a state of the sub-portion that would have been obtained if the erroneous packet 24 instead would have been correctly processed/received. Thus, for the purpose of the following processing of the LRAP there is preferably no difference in the scene states as compared to a situation when all previous packets of the secondary stream 20 were correct.

Figure 11:
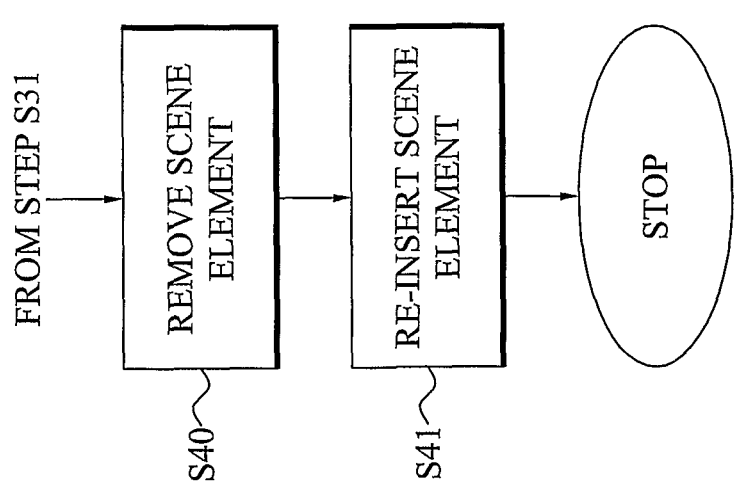
FIG. 11 is a flow diagram illustrating the state creating step of the flow diagram in FIG. 10 according to an embodiment of the present invention.

FIG. 11 is a flow diagram illustrating an embodiment of the state creating step of FIG. 10 in more detail. The method continues from step S31 of FIG. 10. In a next step S40, the terminal processes the local random access data and the instructions included therein to remove a scene element or scene tree node that is not correct due to the previous error in the packet reception or processing. Thus, the data includes a remove instruction and furthermore includes identifiers of the scene element or node, onto which the remove instruction should be applied. The instructions preferably also comprise a re-insert command, which is used in step S41. The re-insert command is associated with an identifier, such as address, allowing identification and fetching of the correct version of the scene element or node to use instead of the incorrect one. By processing, such as rendering, the scene element, the correct starting state of the scene sub-portion is obtained and the method ends.

Another possible state creating embodiment can, as was previously mentioned, be utilizing a re-setting command that is applied to an attribute value associated with the scene sub-portion. The command is furthermore accompanied with information of the actual value the attribute value should have.

Figure 12:
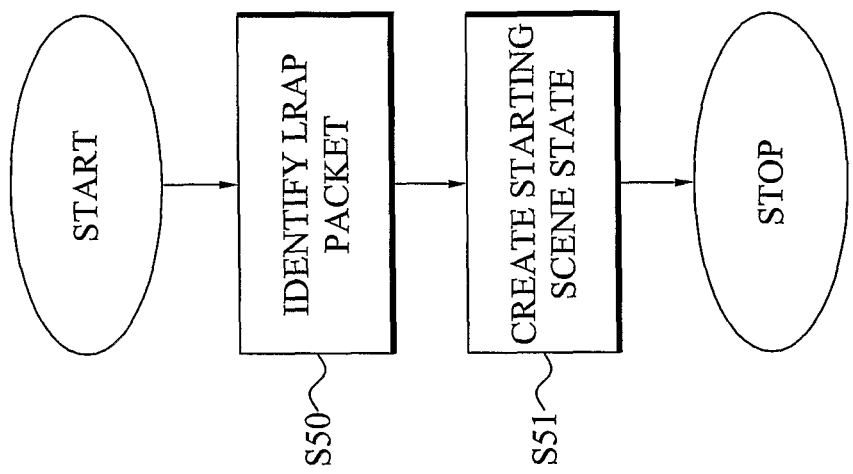
FIG. 12 is a flow diagram illustrating a method of tuning-in to a secondary stream during a rich media session according to an embodiment of the present invention.

FIG. 12 is a flow diagram illustrating another use of the local random access data of the present invention. The figure illustrates a method of tuning-in to a secondary stream of rich media packets for a terminal during an ongoing media session involving rendering a scene representable by rich media packets of a primary stream. The terminal starts listening to the channel employed for transmission of the rich media packets of the secondary stream. Header markers included in the packets are preferably employed in step S50 for identifying one of the packets in the secondary stream as a LRAP-carrying packet. The terminal can then tune-in to the secondary stream by processing the local random access data in the identified packet to thereby create a starting state of a sub-portion of the scene without affecting the scene state of the other scene portions.

Once the starting state of the scene sub-portion has been obtained, the terminal can continue by receiving and processing rich media packets of both the primary and secondary stream. The majority of these following packets will contain scene updates applicable to the complete scene or only to portions of the scene. Processing of these subsequent packets will create different updated states of the scene and scene sub-portions.

Above the present invention has mainly been discussed in connection with usage of LRAP in one secondary stream associated with a primary stream. However, the teachings of the present invention can be used in connection with multiple secondary streams that are associated with the same or different primary stream(s). Preferably, all RAPs of all secondary streams are local random access points according to the present invention.

Figure 13:
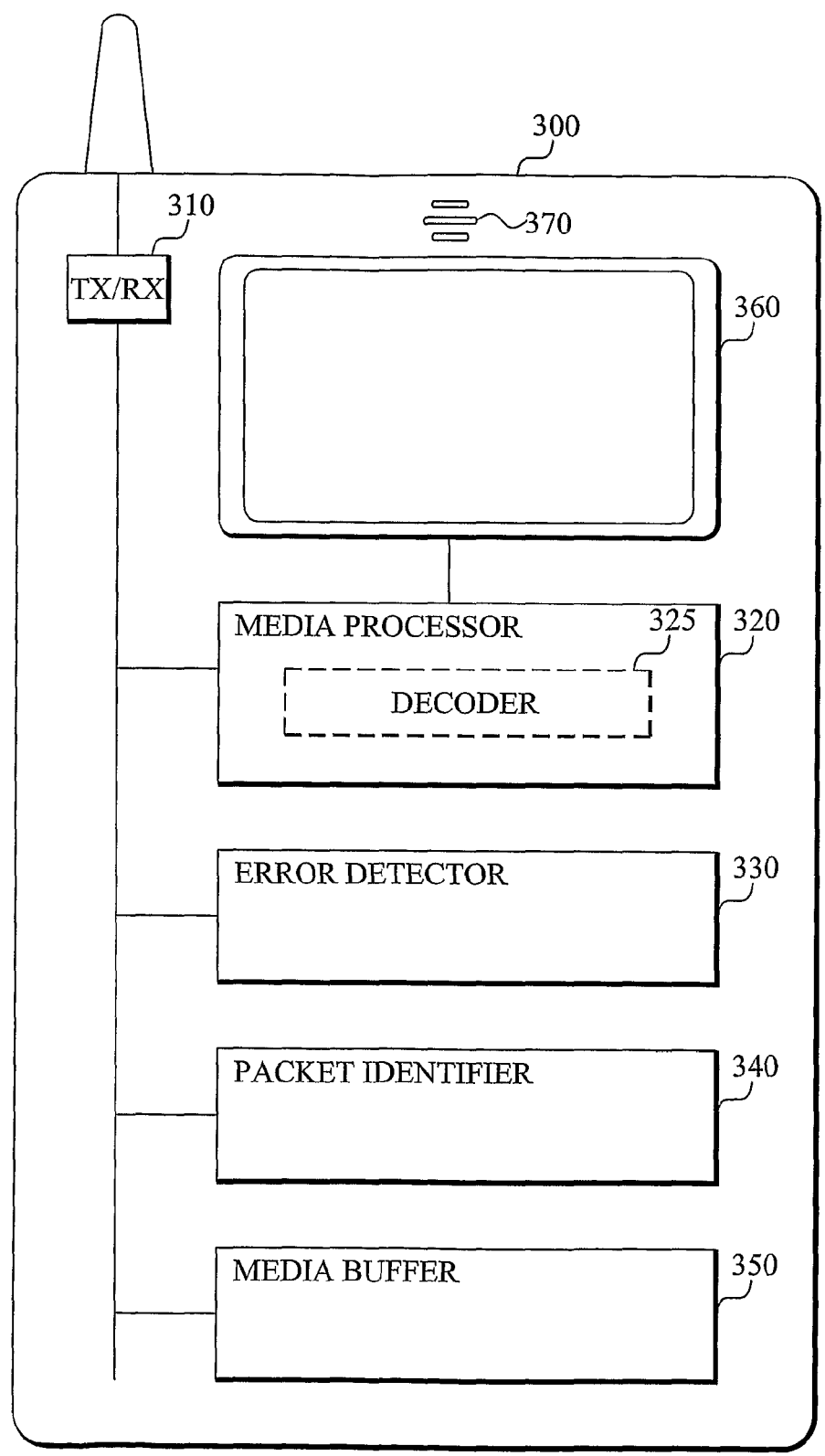
FIG. 13 is a schematic block diagram of a user terminal according to an embodiment of the present invention.

FIG. 13 is a schematic block diagram of a user terminal 300 according to the present invention. This user terminal 300 comprises a transmitter and receiver or transceiver 310, schematically illustrated as a single unit in the figure. The unit 310 includes traditional transmitter/receiver functionality, such as modulator/demodulator, etc. The receiver part of the unit 310 is in particular adapted for receiving rich media packets of a primary stream and secondary stream according to the present invention.

The terminal 300 also comprises a media buffer 350 for temporarily storing rich media packets of the streams received by the receiver 310. This buffer 350 is mainly employed for combating jitter occurring when transmitting the media packets over a network.

A rich media processor 320 is arranged for decoding, optionally using a dedicated decoder 325, and rendering rich media fetched from the media buffer 350. The rendered media is displayed on a connected display screen 360 and possibly played on a loudspeaker 370.

An error detector 330 is arranged connected to the receiver 310 and/or a decoder 325 of the media processor 320. This detector 330 investigates whether any rich media packet is incorrectly received by the receiver 310, cannot be correctly decoded by the media decoder 325 and/or cannot be processed by the processor 320. In such a case, the detector 330 preferably forwards a packet identification request to a packet identifier 340 arranged in the user terminal 300.

The packet identifier 340 identifies, in the media buffer 350, a rich media packet previously received by the receiver 310 and which comprises local random access data according to the invention. The identifier 340 preferably searches through previously received media packets in the buffer 350 until it identifies a LRAP carrying packet belonging to a secondary stream, to which the erroneous packet belong. The identifier 340 preferably searches through the header data of the packets in the buffer 350 unit it finds a header marker having a defined value corresponding to a LRAP. In the case of several such LRAP carrying packets stored in the buffer 350, the identifier 340 preferably identifies and selects the LRAP packet that is following closest to the incorrectly incorrect rich media packet in the stream. However, if the local random access data is preferably general enough, it can be used to combat any previous error.

Once the packet identifier 340 has identified a LRAP packet, the processor 320 processes the data therein for creating a starting state of a sub-portion of the scene displayed on the screen 360 without affecting other scene portions.

The processor 330 could for instance use a remove instruction in the LRAP packet to remove a scene element or scene tree node(s) and replace the scene element or tree node(s) with a correct version. Alternatively, or in addition, a re-setting instruction can be used for setting an attribute to a correct, current value.

When tuning-in to a secondary stream during an ongoing media session involving reception of rich media packets of a primary stream and optionally at least one other secondary stream, the receiver 310 receives rich media packets of the secondary stream and temporarily store them in the media buffer 350. The packet identifier searches through these secondary stream packets for identifying, preferably based on header information, a LRAP carrying packet. Once such a rich media packet has been identified, the media processor 320 processes the local random access data therein to create a starting state of a sub-portion of a scene presented on the display screen 360 but without affecting a scene state of other scene portions.

The media processor 320 can then continue by processing scene update packets of the secondary stream in addition to processing rich media packets of the primary stream and the optionally at least one other secondary stream.

The units 310 to 340 of the user terminal 300 may be provided as software, hardware or a combination thereof.

It will be understood by a person skilled in the art that various modifications and changes may be made to the present invention without departure from the scope thereof, which is defined by the appended claims.

REFERENCES

[1] Scalable Vector Graphics (SVG) Tiny 1.2 Specification—W3C Candidate Recommendation, 10 Aug. 2006
[2] 3GPP S4-AHP255: "MORE Technical Proposal for Dynamic and Interactive Multimedia Scenes (DIMS)"
[3] ISO/IEC 14496-20: "Information technology—Coding of audio-visual objects—Part 20: LASeR (Lightweight Applications Scene Representation)"
[4] IETF RFC 3550: "RTP: A Transport Protocol for Real-Time Applications"

The invention claimed is:

1. A method of providing a secondary stream of rich media packets defining scene states of a sub-portion of a scene representable by a primary stream of rich media packets, said method comprising the steps of:
providing local random access data defining a complete instruction set for enabling, when being processed, tuning in to said secondary stream and creation of a starting state of said sub-portion of said scene without affecting a scene state of other portions of said scene;
generating a rich media packet comprising said local random access data; and
inserting said generated rich media packet into said secondary stream.

2. The method according to claim 1, wherein said local random access data enables, when being processed, creation of said starting state without usage of any instructions contained in previous rich media packets of said secondary stream.

3. The method according to claim 1, further comprising providing scene update information applicable to said starting state to achieve, when being processed, a scene state of said sub-portion of said scene, said generating step comprises generating said rich media packet comprising said local random access data and said scene update information.

4. The method according to claim 1, further comprising setting a header marker of said rich media packet to a predefined value signaling that said rich media packet comprises random access data.

5. The method according to claim 1, further comprising the step of transmitting rich media packets of said secondary stream to at least one user terminal.

6. The method according to claim 1, wherein said providing step comprises providing local random access data defining i) a removal of a scene element from said sub-portion of said scene and ii) reinserting a correct version of said scene element into said sub-portion of said scene to form said starting state.

7. The method according to claim 1, wherein said providing step comprises providing local random access data defining a resetting of an attribute value associated with said sub-portion of said scene.

8. The method according to claim 1, further comprising receiving a terminal-specific request for local random access data, wherein said providing step is performed based on said terminal-specific request.

9. The method according to claim 8, wherein said providing step comprises providing said local random access data based on a rich media packet identifier included in said terminal-specific request and corresponding to a previous rich media packet of said secondary stream incorrectly processed by a user terminal.

10. A media server comprising:
a data provider for providing local random access data defining a complete instruction set enabling, when being processed, tuning in to said secondary stream and creation of a starting state of sub-portion of a scene defined by a secondary stream of rich media packets without affecting a scene state of other portions of said scene representable by a primary stream of rich media packets;
a packet generator for generating a rich media packet comprising said local random access data; and
a stream generator for inserting said generated rich media packet into said secondary stream.

11. The media server according to claim 10, further comprising an update provider arranged for providing scene update information applicable to said starting state to achieve, when being processed, a scene state of said sub-portion of said scene, wherein said packet generator is arranged for generating said rich media packet comprising said local random access data and said scene update information.

12. The media server according to claim 10, further comprising a header processor arranged for setting a header marker of said rich media packet to a predefined value signaling that said rich media packet comprises random access data.

13. The media server according to claim 10, further comprising a transmitter connected to said stream generator for transmitting rich media packets of said secondary stream to at least one user terminal.

14. The media server according to claim 10, further comprising a receiver arranged for receiving a terminal-specific request for local random access data, wherein said data provider is arranged connected to said receiver for providing said local random access data based on said terminal-specific request.

15. A media system comprising:
a first media server for providing, a primary stream of rich media packets defining a scene; and
a second media server according to claim 10 for providing a secondary stream of rich media packets defining a sub-portion of said scene.

16. A method of recovering from a processing error of rich media of a secondary stream of rich media packets defining a sub-portion of a scene representable by a primary stream of rich media packets, said method comprising the steps of:
identifying an incorrectly processed rich media packet of said secondary stream;
receiving a rich media packet of said secondary stream comprising local random access data enabling, when being processed, tuning in to said secondary stream;
creating, based on said local random access data, a starting state of said sub-portion of said scene without affecting a scene state of other portions of said scene.

17. The method according to claim 16, wherein said starting state corresponds to a state of said sub-portion of said scene that would be achievable if said identified rich media packet would have been correctly processed.

18. The method according to claim 16, wherein said creating step comprises the steps of:
removing a scene element from said sub-portion of said scene based on said local random access data; and
re-inserting, based on said local random access data, a correct version of said scene element into said sub-portion of said scene to form said starting state.

19. The method according to claim 16, wherein said creating step comprises step re-setting of an attribute value associated with said sub-portion of said scene based on said local random access data.

20. A method of tuning-in to a secondary stream of rich media packets during an ongoing media session involving rendering a scene representable by rich media packets of a primary stream, said rich media packets of said secondary stream representing a sub-portion of said scene, said method comprising the steps of:
identifying, in said secondary stream, a rich media packet comprising local random access data; and
tuning-in to said secondary stream by processing said local random access data to create a starting state of said sub-portion of said scene without affecting a scene state of other portions of said scene.

21. The method according to claim 16, further comprising processing scene update information included in said rich media packet in relation to said local random access data to create an updated state of said sub-portion of said scene.

22. The method according to claim 16, further comprising identifying said rich media packet comprising said local random access data based on a header marker included in said rich media packet.

23. A user terminal comprising:
a receiver for receiving rich media packets of a primary stream representing a scene and rich media packets of a secondary stream defining a sub-portion of said scene;
an error detector for identifying a rich media packet of said secondary stream incorrectly received by said receiver or incorrectly decoded by a decoder of said user terminal;
a processor for creating, based on local random access data in a rich media packet of said secondary stream received by said receiver, where said local random access data enables, when being processed, tuning in to said secondary stream, a starting state of said sub-portion of said scene without affecting a scene state of other portions of said scene.

24. The user terminal according to claim 23, further comprising a packet identifier arranged for identifying said rich media packet comprising said local random access data based on a header marker included in said rich media packet.

25. The user terminal according to claim 23, wherein said processor is arranged for i) removing a scene element from said" sub-portion-of said scene based on said local random access data; and ii) re-inserting, based on said local random access data, a correct version of said scene element into said sub-portion of said scene to form said starting state.

26. The user terminal according to claim 23, wherein said processor is arranged for re-setting of an attribute value associated with said sub-portion of said scene based on said local random access data.

27. A user terminal comprising:
a receiver for receiving rich media packets of a primary stream representing a scene;
a packet identifier for identifying, in a secondary stream of rich media packets defining a sub-portion of said scene, a rich media packet comprising local random access data enabling; when being processed, tuning in to said secondary stream; and
a processor for processing said local random access data to create a starting state of said sub-portion of scene without affecting a scene state of other portions of said scene to enable a tuning-in to said secondary stream.

28. The user terminal according to claim 27, wherein said packet identifier is arranged for identifying said rich media packet comprising said local random access data based on a header marker included in said rich media packet.

29. The user terminal according to claim 23 wherein said rich media packet also comprises scene update information applicable to said starting said, and said processor is arranged for creating an updated state of said sub-portion of said scene by processing said scene update information in relation to said local random access data.

* * * * *